United States Patent
Amano et al.

(10) Patent No.: US 10,458,097 B2
(45) Date of Patent: Oct. 29, 2019

(54) HYBRID WORK MACHINE

(71) Applicant: Hitachi Construction Machinery Co., Ltd., Taito-ku, Tokyo (JP)

(72) Inventors: Hiroaki Amano, Tsukuba (JP); Shinya Imura, Toride (JP); Ryouhei Yamashita, Tsuchiura (JP); Shinji Ishihara, Ushiku (JP); Shinji Nishikawa, Kasumigaura (JP); Masafumi Hita, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 65 days.

(21) Appl. No.: 15/758,273

(22) PCT Filed: Sep. 2, 2016

(86) PCT No.: PCT/JP2016/075909
§ 371 (c)(1),
(2) Date: Mar. 7, 2018

(87) PCT Pub. No.: WO2017/110157
PCT Pub. Date: Jun. 29, 2017

(65) Prior Publication Data
US 2018/0258613 A1      Sep. 13, 2018

(30) Foreign Application Priority Data

Dec. 24, 2015  (JP) ................................. 2015-252636

(51) Int. Cl.
*E02F 9/20* (2006.01)
*B60K 6/36* (2007.10)
(Continued)

(52) U.S. Cl.
CPC .............. *E02F 9/2075* (2013.01); *B60K 6/28* (2013.01); *B60K 6/36* (2013.01); *B60K 6/48* (2013.01);
(Continued)

(58) Field of Classification Search
CPC ..... E02F 9/2075; E02F 9/2235; F04B 49/065; B60K 6/28
See application file for complete search history.

(56) References Cited

U.S. PATENT DOCUMENTS 7,525,206 B2 * 4/2009 Kagoshima .............. B60K 6/12
290/400
8,468,816 B2 * 6/2013 Sora ........................ B60K 6/485
60/414
(Continued)

FOREIGN PATENT DOCUMENTS

EP     2 444 555 A1    4/2012
JP     3941951 B2      7/2007
(Continued)

OTHER PUBLICATIONS

Japanese-language International Search Report (PCT/ISA/210) issued in PCT Application No. PCT/JP2016/075909 with English translation dated Dec. 6, 2016 (five (5) pages).
(Continued)

*Primary Examiner* — Thomas E Lazo
(74) *Attorney, Agent, or Firm* — Crowell & Moring LLP (57) ABSTRACT

A hybrid work machine that can suppress excessive limiting on pump absorption power even in a situation in which supply of electric power to an electric motor is limited is provided. The hybrid work machine includes: an engine 22; an assist generator motor 23 connected to the engine 22 in such a manner that a torque can be transmitted to the engine 22; an electric storage device 24 that supplies electric power
(Continued)

to the assist generator motor 23; a monitoring device 28 that monitors the electric storage device 24 and that acquires electric storage device information; a hydraulic pump 41 driven by the engine 22 and the assist generator motor 23; and a pump regulator 43 that regulates a delivery flow rate of the hydraulic pump 41. The hybrid work machine includes: an increasing rate computing section 81 that computes an allowable increasing rate r in response to the electric storage device information for pump absorption power; a limited power computing section 82 that computes a limited value WPlim of the pump absorption power on the basis of the allowable increasing rate r; and a pump control section 86 that controls the delivery flow rate of the hydraulic pump 41 in response to the limited pump power WPlim.

8 Claims, 7 Drawing Sheets (51) Int. Cl.
*B60K 6/48* (2007.10)
*B60W 10/26* (2006.01)
*F04B 49/06* (2006.01)
*F04B 49/12* (2006.01)
*B60K 6/28* (2007.10)
*B60K 6/485* (2007.10)
*F04B 49/08* (2006.01)
*F04B 49/10* (2006.01)
*E02F 9/22* (2006.01)
*B60L 50/16* (2019.01)
*B60L 1/00* (2006.01)
*B60W 20/13* (2016.01)

(52) U.S. Cl.
CPC .............. *B60K 6/485* (2013.01); *B60L 1/003* (2013.01); *B60L 50/16* (2019.02); *B60W 10/26* (2013.01); *E02F 9/2235* (2013.01); *F04B 49/06* (2013.01); *F04B 49/065* (2013.01); *F04B 49/08* (2013.01); *F04B 49/103* (2013.01); *F04B 49/106* (2013.01); *F04B 49/12* (2013.01); *B60L 2200/40* (2013.01); *B60W 20/13* (2016.01); *B60Y 2200/41* (2013.01); *B60Y 2200/92* (2013.01); *F04B 2203/0208* (2013.01); *F04B 2203/0209* (2013.01); *F04B 2205/05* (2013.01); *F04B 2205/09* (2013.01)

(56) References Cited

U.S. PATENT DOCUMENTS

| 8,739,906 B2* | 6/2014 | Kawashima | B60K 6/485 180/65.22 |
| 9,013,050 B2* | 4/2015 | Yamashita | H02P 9/00 290/40 R |
| 2010/0170239 A1 | 7/2010 | Sora | |

FOREIGN PATENT DOCUMENTS

| JP | 2010-159648 A | 7/2010 |
| JP | 2011-2085 A | 1/2011 |
| JP | 4633813 B2 | 2/2011 |
| JP | 2012-233312 A | 11/2012 |
| JP | 2013-56647 A | 3/2013 |

OTHER PUBLICATIONS

Japanese-language Written Opinion (PCT/ISA/237) issued in PCT Application No. PCT/JP2016/075909 dated Dec. 6, 2016 (three (3) pages).
International Preliminary Report on Patentability (PCT/IB/338 & PCT/IB/373) issued in PCT Application No. PCT/JP2016/075909 dated Jul. 5, 2018, including English translation of document C2 (Japanese-language Written Opinion (PCT/ISA/237) previously filed on Mar. 7, 2018) (six (6) pages).

* cited by examiner

HYBRID WORK MACHINE

TECHNICAL FIELD

The present invention relates to a hybrid work machine, such as a hydraulic excavator or a wheel loader, equipped with not only an engine but also an electric motor as power sources.

BACKGROUND ART

There is known a hybrid work machine that uses not only an engine but also a generator motor for the purpose of achieving reduction of engine gas emissions and energy saving (refer to Patent Document 1). In the hybrid work machine of this type, the engine and the generator motor are provided coaxially, the generator motor and the engine drive a hydraulic pump, and hydraulic actuators are driven by a hydraulic fluid delivered from the hydraulic pump. When engine power is higher than pump absorption power, the generator motor is driven by excessive engine power to charge an electric storage device. When the engine power is lower than the pump absorption power, the generator motor is driven by electric power supplied from the electric storage device to assist the engine power. In this way, power of the generator motor makes up a shortfall in output power required by a machine body, so that the engine is miniaturized to improve fuel economy. There is also known that power of a generator motor makes up a shortfall in engine power during abrupt increase of power required by a hydraulic pump, for example, during abrupt operation (refer to Patent Document 2).

PRIOR ART DOCUMENT

Patent Document

Patent Document 1: Japanese Patent No. 3941951
Patent Document 2: Japanese Patent No. 4633813

SUMMARY OF THE INVENTION

Problem to be Solved by the Invention

The hybrid work machine has the following problem. If work that imposes heavy load on the hydraulic actuators continues, then the generator motor is unable to output the power due to reduction of a remaining electric storage amount, and lug-down or engine stalling possibly occurs. To address the problem, Patent Document 1 discloses limiting a maximum value of the pump absorption power in response to the remaining electric storage amount. This approach is effective for suppressing the lug-down and the engine stalling.

However, if the generator motor outputs the power to make up the shortfall in the engine output power during an abrupt load increase as described in Patent Document 2 and the remaining electric storage amount is insufficient, there is a limit to the power of the generator motor that can make up the shortfall. Owing to this, the pump absorption power is set low at a time of starting for prevention of the occurrence of the engine stalling or the like. In a state in which the pump absorption power is limited, it is impossible to exhibit a performance inherent in the machine in later work.

An object of the present invention is to provide a hybrid work machine that can suppress excessive limiting on pump absorption power even in a situation in which supply of electric power to an electric motor is limited.

Means for Solving the Problem

To attain the above object, the present invention provides a hybrid work machine including: an engine; an electric motor connected to the engine in such a manner that a torque can be transmitted to the engine; an electric storage device that supplies electric power to the electric motor; a monitoring device that monitors a state of the electric storage device and that acquires electric storage device information; a hydraulic pump driven by power of the engine and power of the electric motor; and a pump regulator that regulates a delivery flow rate of the hydraulic pump. The hybrid work machine includes: an increasing rate computing section that computes an allowable increasing rate in response to the electric storage device information for pump absorption power that is absorption power of the hydraulic pump; a limited power computing section that computes limited pump power that is a limited value of the pump absorption power on the basis of the allowable increasing rate; and a pump control section that outputs a command signal to the pump regulator in response to the limited pump power and that controls the delivery flow rate of the hydraulic pump.

Effect of the Invention

According to the present invention, it is possible to suppress excessive limiting on pump absorption power even in a situation in which supply of electric power to an electric motor is limited.

MODES FOR CARRYING OUT THE INVENTION

Embodiments of the present invention will be described hereinafter with reference to the drawings.

First Embodiment

1. Hybrid Work Machine

Figure 1:
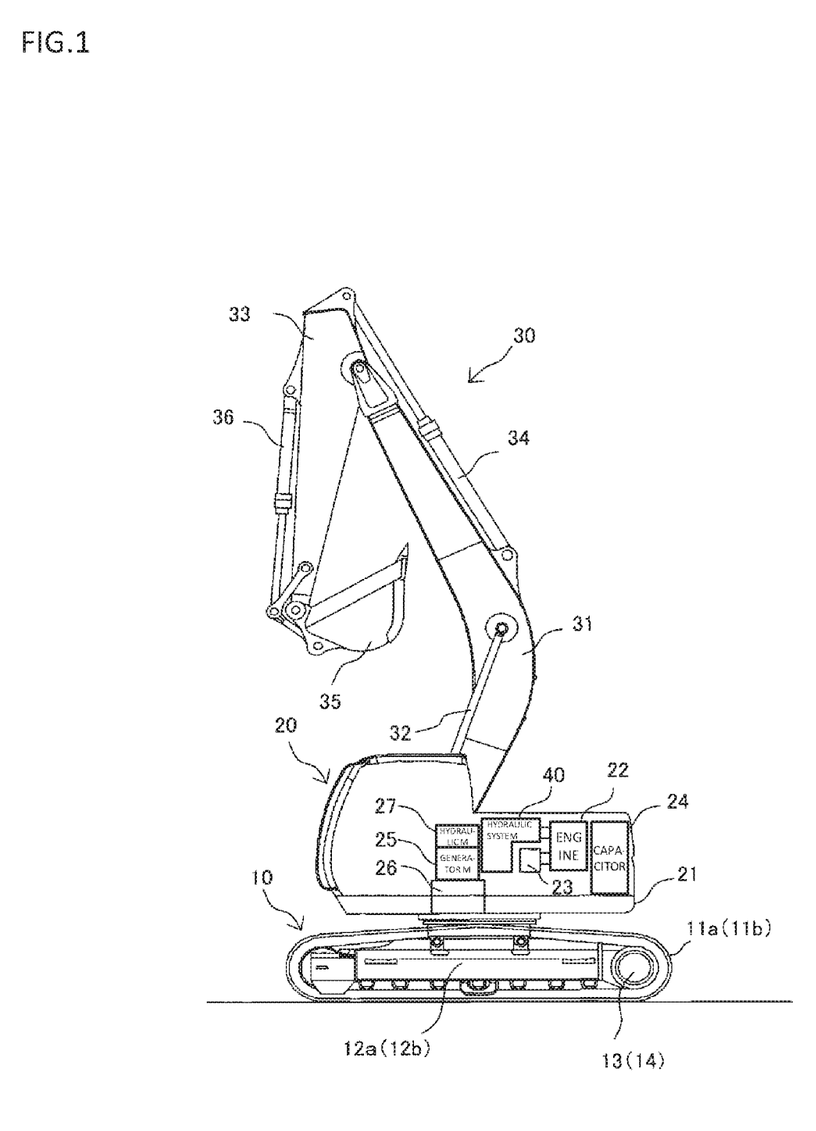
FIG. 1 is a partially perspective side view of a hybrid hydraulic excavator that is an example of a hybrid work machine according to a first embodiment of the present invention.

FIG. 1 is a partially perspective side view of a hybrid hydraulic excavator that is an example of a hybrid work machine according to a first embodiment of the present invention. It is noted, however, that the hybrid hydraulic excavator is one example of application and the present invention is applicable to other hybrid work machines such as a hybrid wheel loader. The hybrid hydraulic excavator shown in FIG. 1 includes a track structure 10, a swing structure 20 swingably provided on the track structure 10, and an excavator mechanism (front work implement) 30 provide on the swing structure 20.

The track structure 10 includes a pair of left and right crawlers 11a and 11b, a pair of left and right crawler frames 12a and 12b, track hydraulic motors 13 and 14 that drive the left and right crawlers 11a and 11b, respectively, a speed reducer for the track hydraulic motors 13 and 14, and the like. FIG. 1 shows only a left side of the crawlers 11a and 11b and a left side of the crawler frames 12a and 12b.

The swing structure 20 includes an operation room, an engine room, and the like, and is mounted in upper portions of the crawler frames 12a and 12b via a swing frame 21. An operation device 70 (refer to FIG. 2) that instructs hydraulic actuators (to be described later) to operate and the like are provided in the operation room. The swing frame 21 is provided in the upper portions of the crawler frames 12a and 12b via a slewing ring to be swingable about a vertical axis. Although not shown, the slewing ring includes an inner ring connected to the crawler frames 12a and 12b and an outer ring connected to the swing frame 21, and is configured such that the outer ring rotates with respect to the inner ring. A swing generator motor 25 and a swing hydraulic motor 27 are provided on the swing frame 21. The swing generator motor 25 as well as the swing hydraulic motor 27 is supported by the outer ring of the slewing ring, and an output shaft of the swing generator motor 25 is engaged with an internal gear of the inner ring via a speed reducer 26. The swing hydraulic motor 27 is provided coaxially with the swing generator motor 25. Furthermore, an electric storage device 24 is connected to the swing generator motor 25, and the swing generator motor 25 is driven by electric power supplied from the electric storage device 24. With this configuration, driving power of the swing hydraulic motor 27 and the swing generator motor 25 is transmitted to the slewing ring via the speed reducer 26, and the swing structure 20 as well as the swing frame 21 swings with respect to the track structure 10.

The excavator mechanism 30 is a front work implement of a multijoint structure including a boom 31, an arm 33, and a bucket 35. The boom 31 is coupled to the swing frame 21 of the swing structure 20 in a vertically rotatable manner. The arm 33 is coupled to a tip end portion of the boom 31 in a longitudinally rotatable manner. The bucket 35 is rotationally coupled to a tip end portion of the arm 33. In addition, the boom 31, the arm 33, and the bucket 35 are driven by a boom cylinder 32, an arm cylinder 34, and a bucket cylinder 36, respectively. The boom cylinder 32, the arm cylinder 34, and the bucket cylinder 36 are hydraulic cylinders.

2. Driving System

Figure 2:
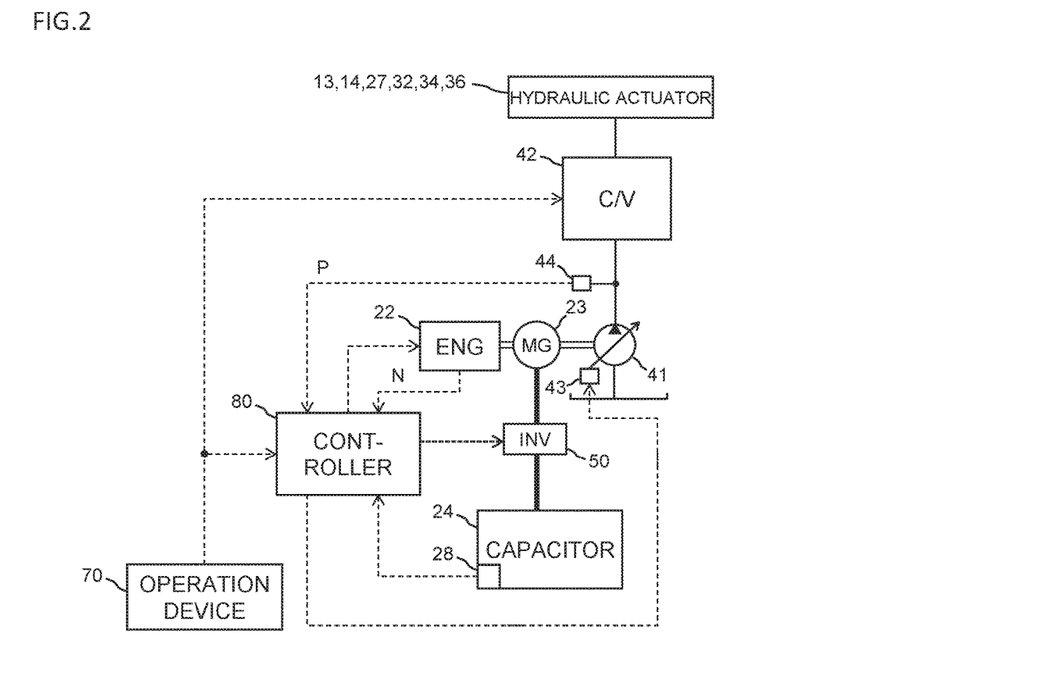
FIG. 2 is a schematic diagram of a driving system provided in the hybrid work machine according to the first embodiment of the present invention.

A driving system for driving various actuators is mounted on the swing frame 21. This driving system includes a hydraulic system 40, an electric system, and a controller 80 (refer to FIG. 2). The hydraulic system 40 is a device that drives hydraulic actuators such as the track hydraulic motors 13 and 14, the swing hydraulic motor 27, the boom cylinder 32, the arm cylinder 34, and the bucket cylinder 36. The track hydraulic motors 13 and 14, the swing hydraulic motor 27, the boom cylinder 32, the arm cylinder 34, the bucket cylinder 36, and the like will be generically referred to as hydraulic actuators, as appropriate. The electric system is a device that drives electric actuators such as an assist generator motor 23 to be described later in addition to the swing generator motor 25. It is the controller 80 that controls the hydraulic system 40 and the electric system. FIG. 2 is a schematic diagram of the driving system.

Hydraulic System

As shown in FIG. 2, the hydraulic system 40 includes a hydraulic pump 41, a pump regulator 43, and a control valve 42. The hydraulic pump 41 is a variable displacement hydraulic pump that generates a hydraulic pressure, and is driven by power output from an engine 22 to deliver a hydraulic fluid for driving the hydraulic actuators. An engine speed sensor is provided in the engine 22, and the engine speed sensor detects an engine speed N. A delivery pressure sensor 44 is provided in a delivery line for the hydraulic pump 41, and the delivery pressure sensor 44 detects a delivery pressure P of the hydraulic pump 41. The control valve 42 is a valve unit that controls each hydraulic actuator to be driven, actuates a corresponding spool in response to an operation signal (a hydraulic pilot signal in the present embodiment) from the operation device 70 provided within the operation room, and controls a flow rate and a direction of the hydraulic fluid supplied from the hydraulic pump 41 to each hydraulic actuator. The operation signal from the operation device 70 is converted into an electrical signal and the electrical signal is also input to the controller 80. The pump regulator 43 regulates a displacement volume (delivery flow rate) of the hydraulic pump 41 on the basis of a signal from the controller 80.

Electric System

The electric system includes an inverter 50, the assist generator motor 23, and the electric storage device 24 in addition to the electric storage device 24 described above. The assist generator motor 23 is an electric motor connected to the engine 22 in such a manner that a torque can be transmitted to the engine 22, and is driven by the electric power supplied from the electric storage device 24 to work with the engine 22 to drive the hydraulic pump 41. While a case in which a generator motor that also functions as a generator is used as the assist generator motor 23 is illustrated in the present embodiment, a simple electric motor that does not function as a generator may be used as the assist generator motor 23. The inverter 50 is electrically connected to not only the assist generator motor 23 but also the swing generator motor 25 (refer to FIG. 1), and is also connected to the electric storage device 24 via a contactor (not shown). The inverter 50 controls driven states of the assist generator motor 23 and the swing generator motor 25 (whether each of the assist generator motor 23 and the swing generator motor 25 performs powering or regeneration) in accordance with commands from the controller 80. The electric storage device 24 is charged and discharged depending on the driven states of the assist generator motor 23 and the swing generator motor 25 on the basis of a signal from the inverter 50. A monitoring device 28 that monitors a battery residual quantity (SOC), charge and discharge electric energy, charge and discharge current amounts, effective electric power, a temperature, and the like of the electric storage device 24, and that acquires these pieces of electric storage device information is provided in the electric storage device 24.

Controller

The delivery pressure P of the hydraulic pump 41 detected by the delivery pressure sensor 44, the engine speed N detected by the engine speed sensor, the operation signals from the operation device 70, and the electric storage device information from the monitoring device 28 are input to the controller 80. The controller 80 generates control commands to a fuel injection system of the engine 22, the pump regulator 43, the inverter 50, and the like on the basis of these types of input signals, and executes changeover between powering and regeneration of the assist generator motor 23 and the swing hydraulic motor 25, output power control over the assist generator motor 23 and the swing hydraulic motor 25, delivery flow rate control over the hydraulic pump 41, output power control over the engine 22, and the like.

Figure 3:
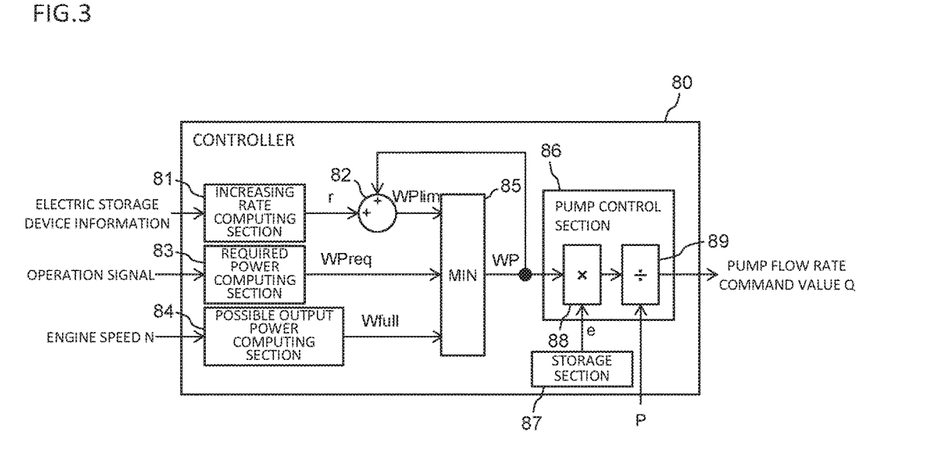
FIG. 3 is a control block diagram related to pump flow rate control by a controller provided in the hybrid work machine according to the first embodiment of the present invention.

FIG. 3 is a control block diagram related to the pump flow rate control by the controller 80. The controller 80 shown in FIG. 3 includes an increasing rate computing section 81, a limited power computing section 82, a required power computing section 83, a possible output power computing section 84, a minimum value selection section 85, a pump control section 86, a storage section 87, and the like.

The increasing rate computing section 81 is a functional section that computes an allowable increasing rate r of power consumed by the hydraulic pump 41 (hereinafter, referred to as pump absorption power) among the power output from the driving system. This allowable increasing rate r is a value determined based on a state of the electric storage device 24, and is set in response to the electric storage device information irrespectively of a required value WPreq of the pump absorption power (hereinafter, referred to as required pump power WPreq) in response to the operation signal of the operation device 70 in such a manner that the pump absorption power increases at a higher increasing rate than that of the output power WE of the engine 22 (hereinafter, referred to as engine power WE). A relationship between the electric storage device information (at least one of the remaining electric storage amount, the charge and discharge current amounts, the effective electric power, the electric storage device temperature, and the like) and the allowable increasing rate r is stored in the increasing rate computing section 81 in advance. The increasing rate computing section 81 computes the allowable increasing rate r in response to the electric storage device information input from the monitoring device 28 on the basis of this relationship.

Figure 4:
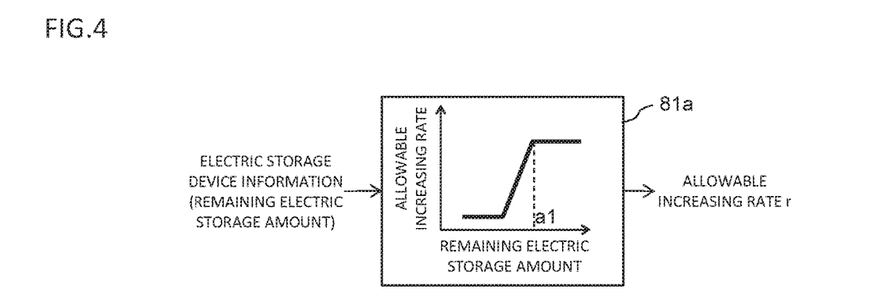
FIG. 4 is a block diagram showing an example of an increasing rate computing section provided in the hybrid work machine according to the first embodiment of the present invention.

Now, FIG. 4 is a block diagram showing an example of the increasing rate computing section 81. An increasing rate computing section 81a illustrated in FIG. 4 receives the remaining electric storage amount input from the monitoring device 28 as the electric storage device information. When the remaining electric storage amount is input as basis for computation of the allowable increasing rate r, a relationship that the allowable increasing rate r becomes lower as the remaining electric storage amount is lower is stored in the increasing rate computing section 81a. The increasing rate computing section 81a computes the allowable increasing rate r that becomes lower as the input remaining electric storage amount is lower. In the present embodiment, the allowable increasing rate r is set to decrease in direct proportion to decrease of the remaining electric storage amount from a set specified value a1 in a region in which the remaining electric storage amount is equal to or lower than the specified value a1.

Figure 5:
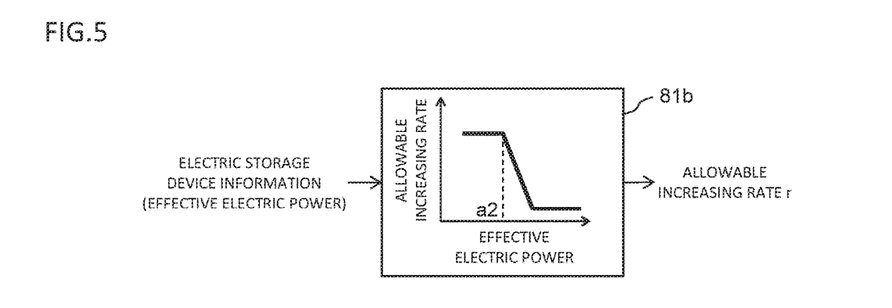
FIG. 5 is a block diagram showing another example of the increasing rate computing section provided in the hybrid work machine according to the first embodiment of the present invention.

FIG. 5 is a block diagram showing another example of the increasing rate computing section 81. An increasing rate computing section 81b illustrated in FIG. 5 receives the charge and discharge electric power of the electric storage device 24 input from the monitoring device 28 as the electric storage device information. When the charge and discharge electric power is input as basis for computation of the allowable increasing rate r, a relationship that the allowable increasing rate r becomes lower as the effective electric power is higher is stored in the increasing rate computing section 81b. The effective electric power is determined by a root mean square of the charge and discharge electric power of the electric storage device 24 for set time. For example, if the set time is 100 seconds, then a mean square of the charge and discharge electric power of the electric storage device 24 is determined for a period from 100 seconds before a present to the present, and a square root thereof is taken. It is thereby possible to determine the effective electric power. If the monitoring device 28 does not execute computation of the effective electric power, the increasing rate computing section 81b may execute the computation. The relationship that the allowable increasing rate r becomes lower as the effective electric power is higher is stored in the increasing rate computing section 81b, and the increasing rate computing section 81b computes the allowable increasing rate r that becomes lower as the determined effective electric power is higher. In the present embodiment, the allowable increasing rate r is set to decrease in direct proportion to increase of the effective electric power from a set specified value a2 in a region in which the effective electric power is equal to or higher than the specified value a2.

Figure 6:
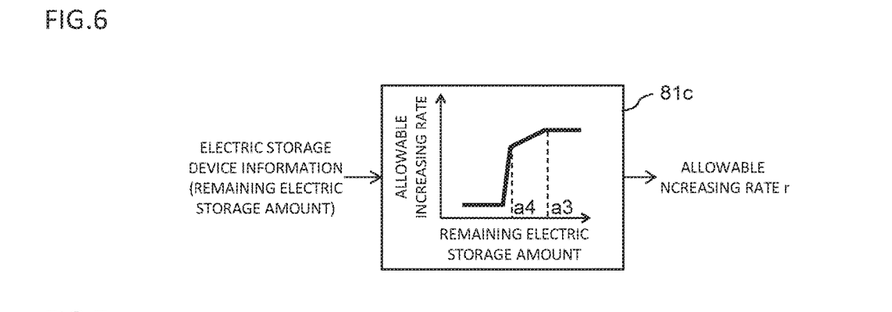
FIG. 6 is a block diagram showing yet another example of the increasing rate computing section provided in the hybrid work machine according to the first embodiment of the present invention.

FIG. 6 is a block diagram showing yet another example of the increasing rate computing section 81. An increasing rate computing section 81c illustrated in FIG. 6 receives the remaining electric storage amount of the electric storage device 24 input from the monitoring device 28 as the electric storage device information. While a relationship between the remaining electric storage amount and the allowable increasing rate r stored in the increasing rate computing section 81c of FIG. 6 is similar to that in the example of FIG. 4 in that the allowable increasing rate r becomes lower as the remaining electric storage amount is lower, the relationship of FIG. 6 differs from that of FIG. 4 in that an increase-decrease rate of the allowable increasing rate r varies depending on the remaining electric storage amount. In the example of FIG. 6, when the remaining electric storage amount decreases from a specified value a3 to a specified value a4 (<a3), the allowable increasing rate r decreases at a certain proportion α1. When the remaining electric storage amount decreases to be lower than the specified value a4, the allowable increasing rate r decreases at a higher certain proportion α2 (>α1). When the allowable increasing rate r is set to vary depending on the remaining electric storage amount, a line of the relationship between the remaining electric storage amount and the allowable increasing rate r may be considered to be set to a curve such that a decrease rate of the allowable increasing rate r becomes higher as the remaining electric storage amount is lower.

Figure 7:
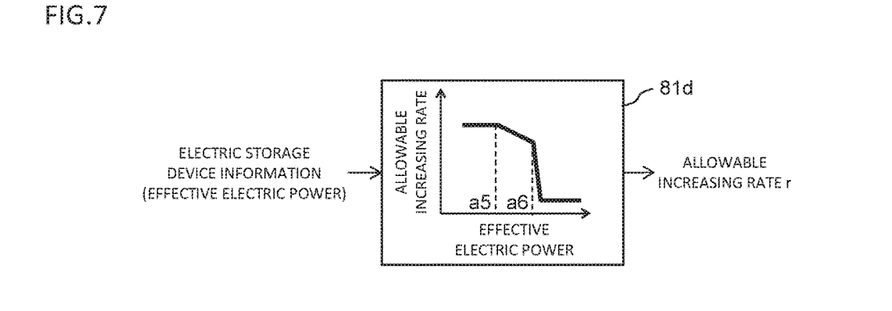
FIG. 7 is a block diagram showing still another example of the increasing rate computing section provided in the hybrid work machine according to the first embodiment of the present invention.

FIG. 7 is a block diagram showing still another example of the increasing rate computing section 81. An increasing rate computing section 81d illustrated in FIG. 7 receives the charge and discharge electric power of the electric storage device 24 input from the monitoring device 28 as the electric storage device information. While a relationship between the effective electric power and the allowable increasing rate r stored in the increasing rate computing section 81d of FIG. 7 is similar to that in the example of FIG. 5 in that the allowable increasing rate r becomes lower as the effective electric power is higher, the relationship of FIG. 7 differs from that of FIG. 5 in that a rate of change of the allowable increasing rate r varies depending on the effective electric power. In the example of FIG. 7, when the effective electric power increases from a specified value a5 to a specified value a6 (>a5), the allowable increasing rate r decreases at a certain proportion α3. When the effective electric power increases to exceed the specified value a6, the allowable increasing rate r decreases at a higher certain proportion α4 (>α3). When the allowable increasing rate r is set to vary depending on the effective electric power, a line of the relationship between the effective electric power and the allowable increasing rate r may be considered to be set to a curve such that the decrease rate of the allowable increasing rate r becomes higher as the effective electric power is higher.

Reference is made back to FIG. 3. The limited power computing section 82 computes a limited value WPlim of the pump absorption power (hereinafter, referred to as limited pump power WPlim) on the basis of the allowable increasing rate r in response to the electric storage device information. In the present embodiment, an adder section is used in the limited power computing section 82. The limited power computing section 82 computes the limited pump power WPlim by adding the allowable increasing rate r computed by the increasing rate computing section 81 this time (in a present cycle) to target pump power WP (to be described later) computed by the minimum value selection device 58 previously (in one cycle before the present cycle). The limited pump power WPlim changes temporally at the allowable increasing rate r as a cycle process by the controller 80 progresses.

The required power computing section 83 is a functional section that computes the required pump power WPreq described above. A relationship between an operation amount of the operation device 70 and the required pump power WPreq is stored in the required power computing section 83 in advance. The required power computing section 83 computes the required pump power WPreq in response to the operation signal input from the operation device 70 on the basis of this relationship.

The possible output power computing section 84 is a functional section that computes possible output power Wfull (hereinafter, referred to as possible output power Wfull). The possible output power Wfull is maximum power that can be output from the driving system by the engine 22 and the assist generator motor 23 at the time (in the present cycle) without occurrence of engine stalling, lug-down, or the like. A value of this possible output power Wfull changes in response to the engine speed N since a torque curve of the engine 22 varies depending on the engine speed N. However, the electric storage device information is not considered in computation of the possible output power Wfull. A relationship between the engine speed N and the possible output power Wfull is stored in the possible output power computing section 84 in advance. The possible output power computing section 84 computes the possible output power Wfull in response to the engine speed N on the basis of this relationship.

The limited pump power WPlim, the required pump power WPreq, and the possible output power Wfull are input to the minimum value selection section 85. The minimum value selection section 85 outputs a minimum value selected from among the three input values as a target value WP of the pump absorption power (hereinafter, referred to as target pump power WP) in the present cycle. This target pump power WP is also output to the limited power computing section 82 to compute the limited pump power WPlim next (one cycle after the present cycle) as described above.

The pump control section 86 is a functional section that controls the pump regulator 43 on the basis of the target pump power WP. This pump control section 86 includes a multiplier section 88 and a divider section 89. The pump control section 86 computes a pump flow rate command value Q in such a manner that the multiplier section 88 multiplies the target pump power WP input from the minimum value selection section 85 by a pump efficiency e of the hydraulic pump 41 read from the storage section 87, and furthermore, the divider section 89 divides a resultant value by the delivery pressure P of the hydraulic pump 41 in the present cycle input from the delivery pressure sensor 44. The controller 80 outputs this pump flow rate command value Q to the pump regulator 43. The delivery flow rate (volume) of the hydraulic pump 41 is thereby controlled in such a manner that the absorption power of the hydraulic pump 41 conforms with the target pump power WP.

3. Procedure for Computing Pump Flow Rate Command Value Q

Figure 8:
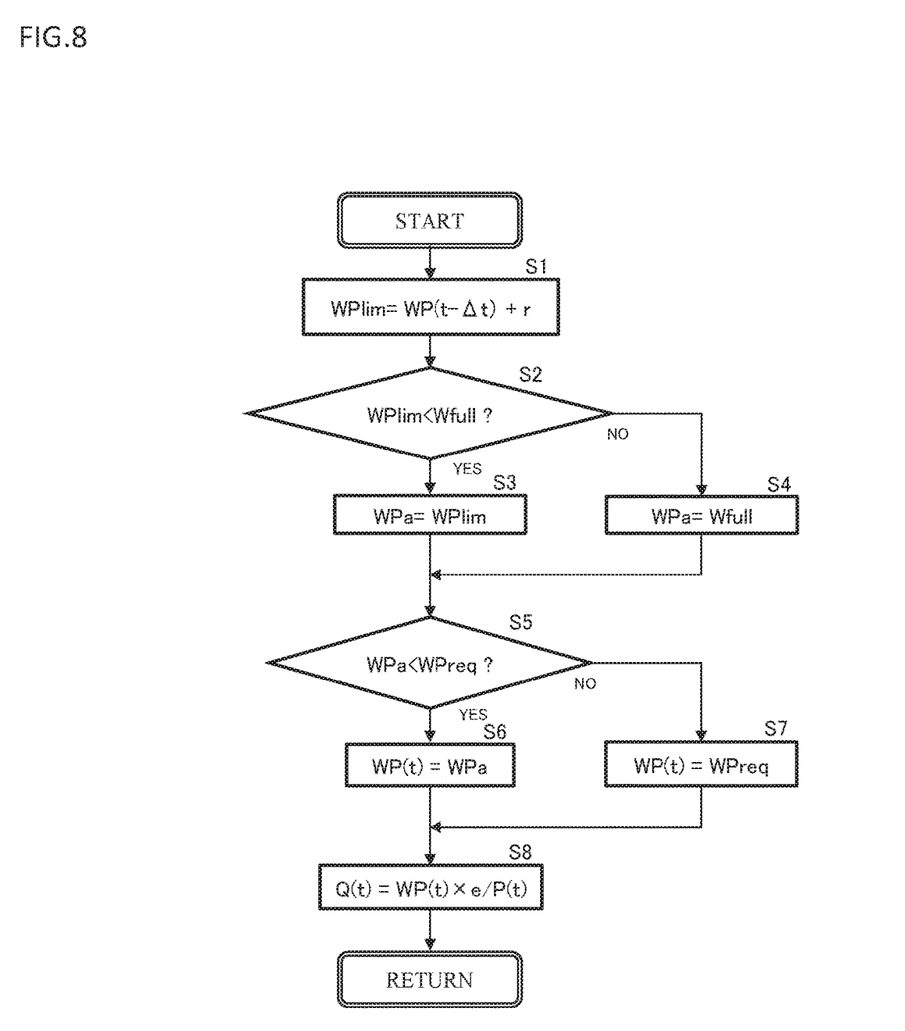
FIG. 8 is a flowchart representing a procedure for computing a pump flow rate command value by the controller provided in the hybrid work machine according to the first embodiment of the present invention.

FIG. 8 is a flowchart representing a procedure for computing the pump flow rate command value Q by the controller 80. As shown in FIG. 8, when recognizing from, for example, the engine speed N that the engine 22 is being driven to rotate, the controller 80 executes a procedure of Steps S1 to S8 of FIG. 8 in a cycle of set time Δt (for example, 0.1 s), repeatedly computes the pump flow rate command values Q depending on circumstances, and outputs the pump flow rate command values Q to the pump regulator 43.

Step S1

When starting the procedure of FIG. 8, the controller 80 receives the electric storage device information input from the monitoring device 28, and causes the increasing rate computing section 81 to compute the allowable increasing rate r of the pump absorption power in response to the electric storage device information. The controller 80 causes the limited power computing section 82 to add the computed allowable increasing rate r to the target pump power WP(t−Δt) of the hydraulic pump 41 computed in one process cycle before the present cycle, and to output an addition result to the minimum value selection section 85 as the limited pump power WPlim.

Steps S2 to S4

The procedure goes to next Step S2. The controller 80 causes the minimum value selection section 85 to determine whether the limited pump power WPlim calculated in Step S1 is lower than the possible output power Wfull computed by the possible output power computing section 84 on the basis of the engine speed N. The controller 80 causes the procedure to go to Step S3 when the limited pump power WPlim in response to the electric storage device information is lower than the possible output power Wfull and a determination result of Step S2 in the minimum value selection section 85 is YES. Conversely, the controller 80 causes the procedure to go to Step S4 when the limited pump power WPlim is equal to or higher than the possible output power Wfull and the determination result in the minimum value selection section 85 is NO. When the procedures goes to Step S3, the controller 80 sets the limited pump power WPlim that is the lower value to an intermediate variable WPa. On the other hand, when the procedures goes to Step S4, the controller 80 sets the possible output power Wfull that is the lower value to the intermediate variable WPa.

Steps S5 to S7

In next Step S5, the controller 80 causes the minimum value selection section 85 to determine whether the intermediate variable WPa calculated in Step S3 or S4 is lower than the required pump power WPreq computed by the required power computing section 83 on the basis of the operation signal. The controller 80 causes the procedure to go to Step S6 when the intermediate variable WPa is lower than the required pump power WPreq and a determination result in the minimum value selection section 85 is YES. Conversely, the controller 80 causes the procedure to go to Step S7 when the intermediate variable WPa is equal to or higher than the required pump power WPreq and the determination result in the minimum value selection section 85 is NO. When the procedure goes to Step S6, the controller 80 sets the intermediate variable WPa that is the lower value to the target pump power WP(t) in the present cycle. On the other hand, when the procedure goes to Step S7, the controller 80 sets the required pump power WPreq that is the lower value to the target pump power WP(t). Through processes in Steps S2 to S7, the minimum value among the limited pump power WPlim, the required pump power WPreq, and the possible output power Wfull is set to the target pump power WP(t).

Step S8

After end of the procedure in Step S6 or S7, the controller 80 causes the procedure to go to Step S8, causes the pump control section 86 to calculate the pump flow rate command value Q(t) in the present cycle using the target pump power WP(t) computed in Steps S2 to S7, the pump efficiency e, and the present pump delivery pressure P(t) and to output the pump flow rate command value Q(t) to the pump regulator 43.

The procedure described above is repeatedly executed for the set time Δt, whereby the pump flow rate command value Q updated per cycle as needed is output to the pump regulator 43, and the delivery flow rate of the hydraulic pump 41 is controlled in such a manner that the pump absorption power is closer to the target pump power WP(t).

4. Behavior of Target Pump Power

Figure 9:
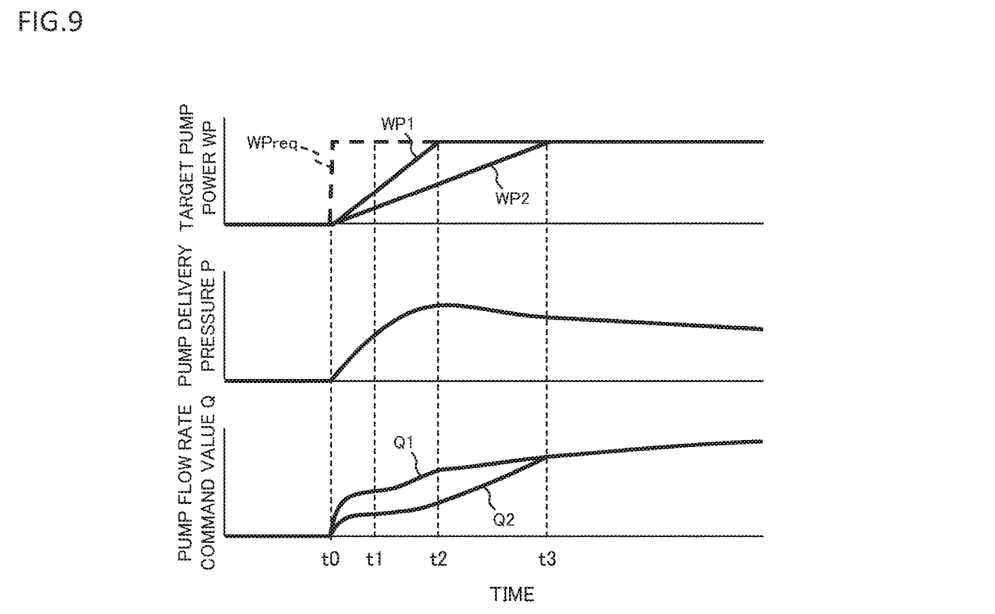
FIG. 9 shows an example of temporal changes of pump absorption power, a pump delivery pressure, and a pump delivery flow rate according to the first embodiment of the present invention.

FIG. 9 shows an example of temporal changes of the pump absorption power, the pump delivery pressure, and the pump delivery flow rate according to the present embodiment. In FIG. 9, time t0 is start time at which the operation device 70 starts operation. In addition, it is assumed that the minimum value selection section 85 selects the limited pump power WPlim as the target pump power WP for a reason, for example, that the remaining electric storage amount of the electric storage device 24 is low.

When the operation amount of the operation device 70 is, for example, a maximum operation amount, the required pump power WPreq for the hydraulic pump 41 abruptly rises as indicated by a dotted line. In the present embodiment, the target pump power WP, by contrast, rises at a gentler increasing rate in response to the electric storage device information than that of the required pump power WPreq, and the target pump power WP then reaches the required pump power WPreq. FIG. 9 illustrates target pump power WP1 and WP2 at different increasing rates. The target pump power WP1 catches up with the required pump power WPreq at time t2 (>t0), while the target pump power WP2 at the low increasing rate relative to that of the target pump power WP1 catches up with the required pump power WPreq at time t3 (>t2). A difference between the target pump power WP1 and WP2 in increasing rate results from the state of the electric storage device 24. When the remaining electric storage amount used when the target pump power WP2 is computed is, for example, low relatively to that used when the target pump power WP1 is computed, the increasing rate of the target pump power WP2 is set gentler than that of the target pump power WP1 as shown in FIG. 9. When the target pump power WP is low, the pump flow rate command value Q is set low even at the same delivery pressure P (hydraulic pressure load) of the hydraulic pump 41. Q1 and Q2 denote the pump flow rate command values computed on the basis of the target pump power WP1 and WP2, respectively. In a case of FIG. 9, the pump flow rate command value Q2 is computed to be lower than the pump flow rate command value Q1 from time t0 to t3.

Figure 10:
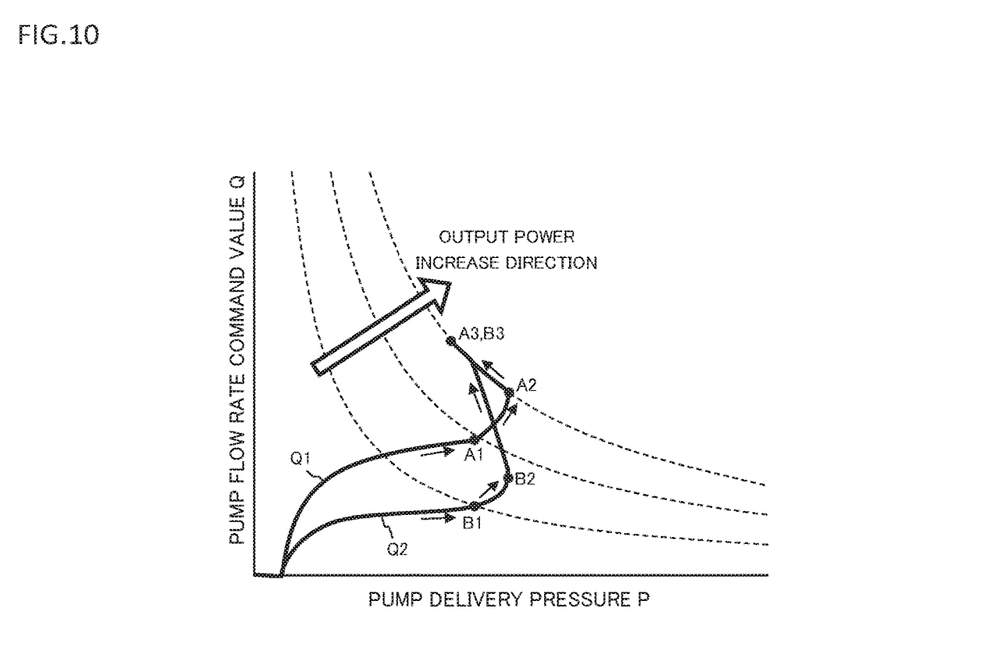
FIG. 10 is a P-Q diagram representing the example of FIG. 9 with a horizontal axis denoting a delivery pressure and a vertical axis denoting a flow rate.

FIG. 10 is a P-Q diagram representing the example of FIG. 9 with a horizontal axis denoting a delivery pressure and a vertical axis denoting a flow rate. In FIG. 10, dotted lines represent equivalent horsepower lines, and solid lines represent changes of the pump flow rate command value Q. In FIG. 10, points A1 and B1 are points each representing the pump delivery pressure P and the pump flow rate command value Q at the time t1 of FIG. 9, points A2 and B2 are points each representing the pump delivery pressure P and the pump flow rate command value Q at the time t2, and points A3 and B3 are points each representing the pump delivery pressure P and the pump flow rate command value Q at the time t3. In FIG. 10, output power (horsepower) increases in an upper right direction. It can be understood that for a period until the time t3, output power by the pump flow rate command value Q2 is suppressed, compared with output power by the pump flow rate command value Q1 at the same time (t1, t2). In addition, after the target pump power WP2 catches up with the target pump power WP1 at the time t3, the output power by the pump flow rate command Q1 is equal to that by the pump flow rate command Q2.

5. Effects

Figure 11:
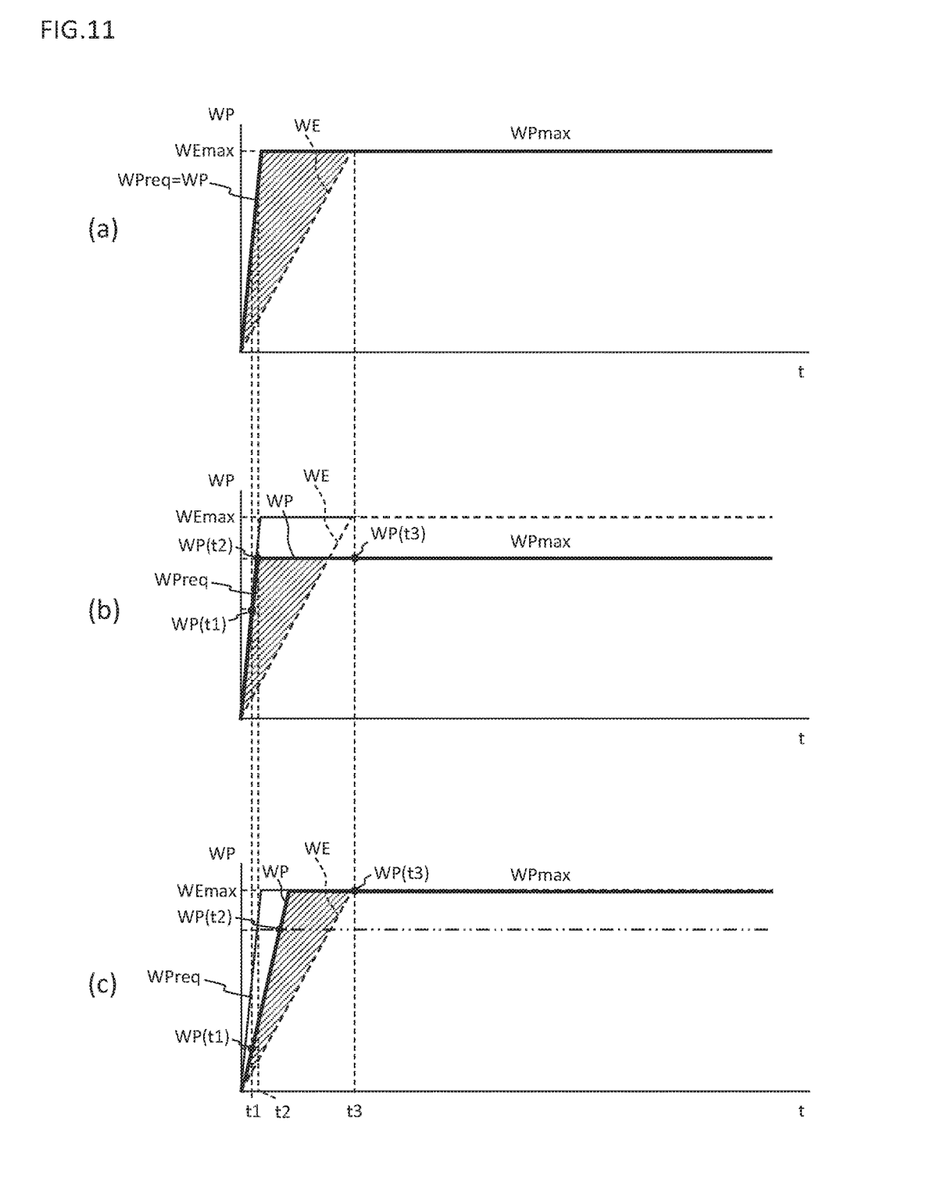
FIG. 11 is an explanatory diagram of effects of the first embodiment of the present invention.

FIG. 11 is an explanatory diagram of effects of the present embodiment. The engine power WE is limited in response to the engine speed N from the viewpoint of prevention of engine stalling or lug-down. For that reason, at a time of, for example, starting by sudden operation, the engine power WE can be increased only at a predetermined increasing rate even if the required pump power WPreq abruptly rises to reach rated maximum output power WEmax of the engine 22. In a case of the hybrid work machine as described in the present embodiment, by contrast, the power of the assist generator motor 23 can make up a shortfall in the engine power WE with respect to the required pump power WPreq at the time of starting. At this time, when supply of the electric power to the assist generator motor 23 is not restricted depending on the state of the electric storage device 24, for example, the state in which the remaining electric storage amount is sufficient, then the power of the assist generator motor 23 (hatching part in FIG. 11(a)) makes up a shortfall in the engine power WE as shown in FIG. 11(a), and the power corresponding to the required pump power WPreq can be applied to the hydraulic pump 41.

Nevertheless, the power of the assist generator motor 23 does not always make up the shortfall in the engine power WE with respect to the required pump power WPreq depending on the state of the electric storage device 24. In this case, if the target pump power WP is raised to follow up the required pump power WPreq, a maximum value WPmax of the limited pump power WPlim (hereinafter, referred to as maximum limited pump power WPmax) is naturally set lower than the rated maximum output power WEmax of the engine 22 as shown in FIG. 11(b) for the following reason. Without suppression of the maximum limited pump power WPmax, the engine stalling or the lug-down possibly occurs when the remaining electric storage amount runs out and the power from the assist generator motor 23 is not added. Since the example in which the target pump power WP is equal to the limited pump power WPlim is described herein, the maximum value of the target pump power WP is equal to the maximum limited pump power WPmax. Therefore, if the maximum limited pump power WPmax is set lower than the rated maximum output power WEmax, the power originally supposed to be output when the engine speed N rises later cannot be output. For example, the target pump power WP(t1) can be made to follow up the required pump power WPreq at the time t1 right after the operation starts; however, the target pump power WP(t2) reaches the maximum limited pump power WPmax at the time t2. As a result, the target pump power WP(t3) remains the maximum limited pump power WPmax and the rated maximum output power WEmax cannot be output even at the time t3 at which the rated maximum output power WEmax should be originally output solely by the engine afterward.

According to the present embodiment, by contrast, when the supply of the electric power to the assist generator motor 23 is limited, the target pump power WP rises more gently than the required pump power WPreq in such a manner that the target pump power WP can reach the rated maximum output power WEmax later even under restrictions on the supply of the electric power, as shown in FIG. 11(c). Therefore, the maximum value of the target pump power WP is not excessively suppressed and the power of the assist generator motor 23 can assist the engine power WE at the time of starting within a restricted range. In a case of the example of FIG. 11(c), the target pump power WP(t1) at the time t1 right after start of the operation is low, compared with the example of FIG. 11(b). However, the target pump power WP can be raised at the higher increasing rate than that of the engine power WE, and the target pump power WP(t3) can reach the rated maximum output power WEmax at the time t3.

As described so far, according to the present embodiment, it is possible to suppress the excessive limiting on the pump absorption power and suppress deterioration of work efficiency even in a situation in which the supply of the electric power to the assist generator motor 23 is limited.

Furthermore, as shown in FIG. 4, it is advantageously possible to suppress the decrease of the remaining electric storage amount when the allowable increasing rate r is determined on the basis of the remaining electric storage amount. In addition, when the decrease rate of the allowable increasing rate r is made to vary depending on the remaining electric storage amount as shown in FIG. 6, the target pump power WP can be set flexibly in response to the remaining electric storage amount depending on situations. For example, a region of the specified values a3 to a4 in FIG. 6 can be set as a region in which a high priority is given to suppression of reduction of the output power over suppression of consumption of the electric power although the suppression of the consumption of the electric power is necessary, and a region equal to or lower than the specified value a4 can be set as a region in which a high priority is given to the suppression of the consumption of the electric power over the suppression of the reduction of the output power.

Moreover, short-time and abrupt charge and discharge could accelerate deterioration of the electric storage device 24. However, computing the allowable increasing rate r on the basis of the effective electric power and suppressing the allowable increasing rate r when the effective electric power is high and abrupt discharge occurs can contribute to protecting the electric storage device 24 and to extending a service life of the electric storage device 24, as shown in FIG. 5. In addition, when the decrease rate of the allowable increasing rate r is made to vary depending on the effective electric power as shown in FIG. 7, the target pump power WP can be flexibly set in response to the effective electric power depending on situations. For example, a region of the specified values a5 to a6 in FIG. 7 can be set as a region in which a high priority is given to the suppression of the reduction of the output power over suppression of discharge although the suppression of discharge is necessary, and a region equal to or higher than the specified value a6 can be set as a region in which a high priority is given to the suppression of the discharge over the suppression of the reduction of the output power. From the viewpoint of determining the target pump power WP while a use strength of the electric storage device 24 is additionally considered, the controller 80 may be configured such that the increasing rate computing section 81 computes the allowable increasing rate r in response to the effective current or the temperature of the electric storage device 24 in place of the effective electric power. The effective current can be determined by a root mean square of charge and discharge currents input from the monitoring device 28 for the set time on the basis of the charge and discharge currents. As the temperature of the electric storage device 24, temperature information about the electric storage device 24 measured by a temperature sensor of the monitoring device 28 can be used. Moreover, when the monitoring device 28 can measure or compute the effective electric power or the effective current, the effective electric power or the effective current may be input to the increasing rate computing section 81 from the monitoring device 28.

Second Embodiment

Figure 12:
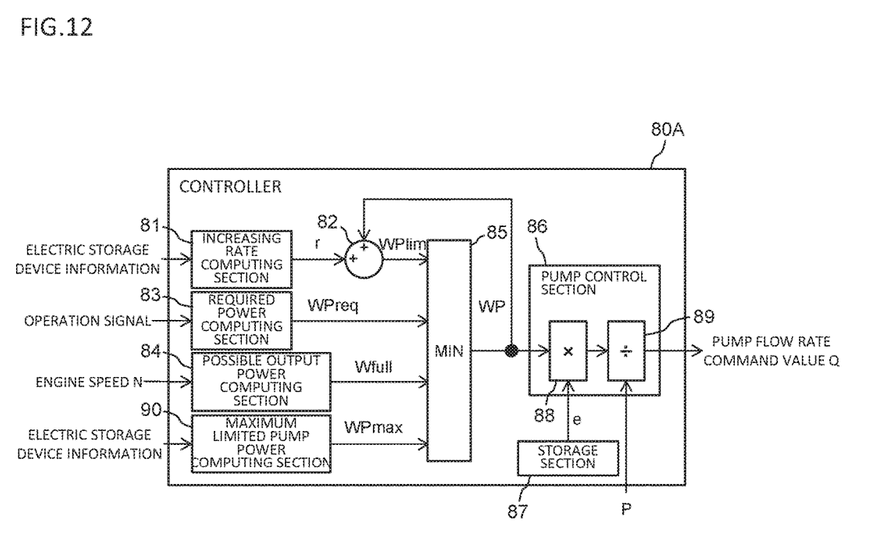
FIG. 12 is a control block diagram related to pump flow rate control by a controller provided in a hybrid work machine according to a second embodiment of the present invention.

FIG. 12 is a control block diagram related to pump flow rate control by a controller provided in a hybrid work machine according to a second embodiment of the present invention. FIG. 12 corresponds to FIG. 3 of the first embodiment. A controller 80A shown in FIG. 12 differs from the controller 80 of FIG. 3 in that the controller 80A further includes a maximum limited power computing section 90 that computes the maximum limited pump power WPmax (maximum value of the limited pump power WPlim) described before. The controller 80A is similar to the controller 80 of FIG. 3 in other elements. Therefore, the similar elements are denoted by the same reference signs as those in the first embodiment and description thereof will be omitted.

A relationship between the electric storage device information and the maximum limited pump power WPmax is stored in the maximum limited power computing section 90 in advance. The maximum limited power computing section 90 computes the maximum limited pump power WPmax in response to the electric storage device information input from the monitoring device 28 on the basis of this relationship, and outputs the maximum limited pump power WPmax to the minimum value selection section 85. The minimum value selection section 85 selects a minimum value from among the limited pump power WPlim, the required pump power WPreq, the possible output power Wfull, and the maximum limited pump power WPmax, and outputs the minimum value to the pump control section 86 as the target pump power WP. The present embodiment is similar to the first embodiment in other configurations and operations.

Figure 13:
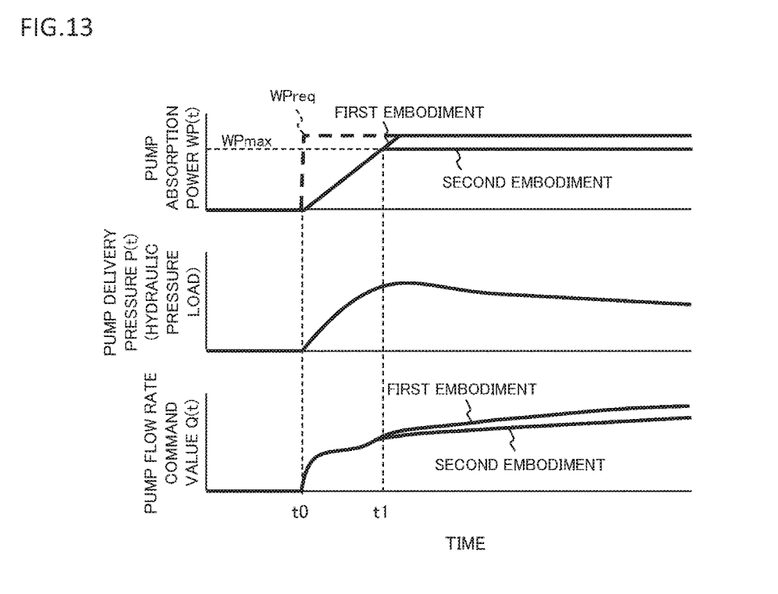
FIG. 13 shows an example of temporal changes of pump absorption power, a pump delivery pressure, and a pump delivery flow rate according to the second embodiment of the present invention.

FIG. 13 shows an example of temporal changes of the pump absorption power, the pump delivery pressure, and the pump delivery flow rate according to the present embodiment. In the present embodiment, when the remaining electric storage amount is lower than a specified value, the maximum limited pump power WPmax is suppressed in response to the remaining electric storage amount. When the supply of the electric power to the assist generator motor 23 is limited, then the limited pump power WPlim is output as the target pump power WP in a region in which the limited pump power WPlim is equal to or lower than the maximum limited pump power WPmax, and the maximum limited pump power WPmax is output as the target pump power WP in a region in which the limited pump power WPlim exceeds the maximum limited pump power WPmax.

Therefore, in a case in which the remaining electric storage amount is low, a case in which the effective electric power is high, or the like, the target pump power WP is set at the gentler increasing rate than that of the required pump power WPreq in the present embodiment similarly to the first embodiment and it is possible to attain similar effects to those of the first embodiment. However, in a range in which the limited pump power WPlim exceeds the maximum limited pump power WPmax even on the same condition as that according to the first embodiment, the target pump power WP is set low and the pump flow rate command value Q is set low in the present embodiment, compared with the first embodiment. In this case, the maximum limited pump power WPmax becomes lower as the remaining electric storage amount decreases as shown in FIG. 13. It is, therefore, advantageously possible to suppress a continuous discharge amount of the electric storage device 24, compared with the first embodiment.

REFERENCE SIGNS LIST 13, 14: Track hydraulic motor (hydraulic actuator)
22: Engine
23: Assist generator motor (electric motor)
24: Electric storage device
27: Swing hydraulic motor (hydraulic actuator)
28: Monitoring device
32: Boom cylinder (hydraulic actuator)
34: Arm cylinder (hydraulic actuator)
36: Bucket cylinder (hydraulic actuator)
41: Hydraulic pump
43: Pump regulator
70: Operation device
81, 81a to 81d: Increasing rate computing section
82: Limited power computing section
83: Required power computing section
85: Minimum value selection section
86: Pump control section
90: Maximum limited power computing section
Q: Pump flow rate command value (command signal)
r: Allowable increasing rate
WE: Engine power (engine output power)
WP: Target pump power
WPlim: Limited pump power
WPmax: Maximum limited pump power
WPreq: Required pump power

The invention claimed is:

1. A hybrid work machine, including:
an engine;
an electric motor connected to the engine in such a manner that a torque can be transmitted to the engine;
an electric storage device configured to supply electric power to the electric motor;
a monitoring device configured to monitor a state of the electric storage device and to acquire electric storage device information;
a hydraulic pump driven by power of the engine and power of the electric motor; and
a pump regulator configured to regulate a delivery flow rate of the hydraulic pump, wherein the hybrid work machine comprises:
an increasing rate computing section configured to compute an allowable increasing rate in response to the electric storage device information for pump absorption power that is absorption power of the hydraulic pump;
a limited power computing section configured to compute limited pump power that is a limited value of the pump absorption power on the basis of the allowable increasing rate; and
a pump control section configured to output a command signal to the pump regulator in response to the limited pump power and to control the delivery flow rate of the hydraulic pump.

2. The hybrid work machine according to claim 1, further comprising:
a hydraulic actuator configured to be driven by a hydraulic fluid delivered from the hydraulic pump;
an operation device configured to instruct the hydraulic actuator to operate; and
a required power computing section configured to compute required pump power that is a required value of the pump absorption power in response to an operation signal of the operation device, and wherein
the allowable increasing rate is set in response to the electric storage device information irrespectively of the required pump power in such a manner that target pump power that is a target value of the pump absorption power increases at an increasing rate higher than an increasing rate of engine output power.

3. The hybrid work machine according to claim 2, including
a minimum value selection section configured to select a minimum value from the required pump power and the limited pump power and to output the minimum value to the pump control section as the target pump power.

4. The hybrid work machine according to claim 3, wherein
the increasing rate computing section is configured to receive a remaining electric storage amount input from the monitoring device as the electric storage device information and to set the allowable increasing rate lower as the remaining electric storage amount is lower.

5. The hybrid work machine according to claim 4, wherein
a decrease rate of the allowable increasing rate is set to vary depending on the remaining electric storage amount.

6. The hybrid work machine according to claim 3, wherein
the increasing rate computing section is configured to receive charge and discharge information about the electric storage device from the monitoring device as the electric storage device information, and to set the allowable increasing rate lower as effective electric power or an effective current determined on the basis of the charge and discharge information is higher, or effective electric power or an effective current input from the monitoring device is higher.

7. The hybrid work machine according to claim 6, wherein
a decrease rate of the allowable increasing rate is set to vary depending on the effective electric power or the effective current determined on the basis of the charge and discharge information, or depending on the effective electric power or the effective current input from the monitoring device.

8. The hybrid work machine according to claim 3, further comprising
a maximum limited power computing section configured to compute maximum limited pump power that is a maximum value of the limited pump power in response to the electric storage device information, wherein
the minimum value selection section is configured to select a minimum value from among the required pump power, the limited pump power, and the maximum limited pump power, and to output the minimum value to the pump control section as the target pump power.

* * * * *